US007450520B2

(12) United States Patent
Bernier et al.

(10) Patent No.: US 7,450,520 B2
(45) Date of Patent: Nov. 11, 2008

(54) REMOTE INTERFACE FOR A NETWORK DEVICE IN THE PHYSICAL PLANT

(75) Inventors: Eric Bernier, Nepean (CA); John Watkins, Ottawa (CA); Glenn Algie, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 947 days.

(21) Appl. No.: 10/617,192

(22) Filed: Jul. 10, 2003

(65) Prior Publication Data

US 2004/0160905 A1 Aug. 19, 2004

Related U.S. Application Data (60) Provisional application No. 60/447,427, filed on Feb. 14, 2003.

(51) Int. Cl.
*H04L 12/26* (2006.01)
*H04Q 7/20* (2006.01)

(52) U.S. Cl. .................. 370/246; 370/242; 455/423

(58) Field of Classification Search .......... 725/78, 725/119, 81–82; 370/401, 463, 241–250, 370/310–350; 455/3.01–3.06, 418–420, 455/423–425

See application file for complete search history.

(56) References Cited

U.S. PATENT DOCUMENTS

| 5,608,171 | A | 3/1997 | Hunter et al. | |
|---|---|---|---|---|
| 6,430,044 | B2 | 8/2002 | Hutchinson et al. | |
| 6,452,942 | B1 * | 9/2002 | Lemieux | 370/468 |
| 6,507,494 | B1 | 1/2003 | Hutchison et al. | |
| 6,514,095 | B1 | 2/2003 | Smith et al. | |
| 6,518,933 | B2 | 2/2003 | Pecora, Jr. et al. | |
| 6,519,255 | B1 | 2/2003 | Graves | |
| 6,535,603 | B2 | 3/2003 | Laetsch | |
| 6,762,992 | B1 * | 7/2004 | Lemieux | 370/216 |
| 6,845,248 | B1 * | 1/2005 | Johnson | 455/554.2 |
| 6,895,185 | B1 * | 5/2005 | Chung et al. | 398/72 |
| 2002/0044567 | A1 * | 4/2002 | Voit et al. | 370/467 |
| 2002/0073434 | A1 * | 6/2002 | Pience | 725/119 |
| 2002/0154629 | A1 * | 10/2002 | Lohman et al. | 370/386 |
| 2003/0226149 | A1 * | 12/2003 | Chun et al. | 725/78 |

* cited by examiner

*Primary Examiner*—Chi H. Pham
*Assistant Examiner*—Tri H. Phan
(74) *Attorney, Agent, or Firm*—Anderson Gorecki & Manaras LLP (57) ABSTRACT

A network device such as a combination ONU-DSLAM deployed outside the central office includes a wireless transceiver to enable a technician to interface with the network device over a wireless control channel. This allows the technician to monitor, interrogate, and control the network device to ascertain performance of the network or the network device and cause the network device to perform particular desired operations. Additionally, providing a wireless interface enables the network technician to fix specific perceived problems in the network device, such as by uploading new software to the network device, to enable the network device to have increased functionality or more reliable performance. Infra-red, wireless, powerline, or another technology may be used to interface with the network device. The wireless access port may also enable subscribers to access the network, for example by causing the network device to act as an 802.11 hot spot.

11 Claims, 4 Drawing Sheets

REMOTE INTERFACE FOR A NETWORK DEVICE IN THE PHYSICAL PLANT

BACKGROUND OF THE INVENTION

1. Field of the Invention

The present invention relates to network equipment deployed in the physical plant and, more particularly, to a method and apparatus for remotely interfacing a network device in the physical plant.

2. Description of the Related Art

Data communication networks may include various computers, servers, nodes, routers, switches, hubs, proxies, and other devices coupled to and configured to pass data to one another. These devices will be referred to herein as "network devices." Data is communicated through the data communication network by passing data packets (or cells, frames, or segments) between the network devices by utilizing one or more communication links. A particular packet may be handled by multiple network devices and cross multiple communication links as it travels between its source and its destination over the network.

Many individual subscribers access the public communications network over twisted wire pair subscriber loops that terminate at a central office. Different levels of service may be provisioned over subscriber loops, such as standard telephone service or higher speed data services. One example of a high speed data service is referred to herein as Digital Subscriber Line (DSL) service. There are many types of DSL service that may be utilized to communicate between the central office and subscribers and the invention discussed herein is not limited to any particular type of DSL service.

Conventionally, electrical equipment has been deployed at the central office in a controlled environment to interface with subscribers over subscriber loops. For example, a DSL Access Multiplexer (DSLAM) may be used to interface between multiple DSL-provisioned subscriber loops and the high bandwidth transmission capabilities on the backbone of the communications network. Typically, only relatively simple electrical equipment, such as signal repeaters, have been deployed outside the central office between the central office and the subscribers. The area outside of the environmentally controlled central office will be referred to herein as the "physical plant." Equipment deployed in the physical plant may be deployed in areas such as on a telephone pole, in a manhole, curbside on a platform, or on aerial wires between telephone poles.

Technical limitations associated with DSL may prevent a service provider from providing DSL service to a subscriber residing more than a predetermined distance from the central office. Additionally, the bandwidth available to a DSL subscriber is generally related to the length of the subscriber loop over which DSL service is to be provided. One proposal to enable larger numbers of customers to subscribe to higher bandwidth DSL services is to deploy active electronic equipment, such as a DSLAM, in the physical plant. Deploying a DSLAM in the physical plant enables the distance between the subscriber and the DSLAM to be reduced, thus increasing the number of customers that may be provisioned with DSL services and increasing the bandwidth that may be provided to existing DSL subscribers.

Deploying active equipment in the physical plant, however, requires the equipment to be maintained and upgraded in the physical plant. Often maintenance and repairs may be effected through the network remotely. However, in particular instances it is advisable or necessary to send a technician out into the physical plant to service the network device. Unfortunately,. device placement and weather conditions may make it difficult or uncomfortable to access the network device in the physical plant.

Where there is a problem on the optical link connecting the active equipment in the physical plant and the central office, it is also desirable to isolate the problem to be able to dispatch a technician to the proper location outside the central office. It would be advantageous, in these situations, to enable the active equipment in the physical plant to participate in evaluation of the fiber. Additionally, it would be advantageous, in these circumstances, to enable emergency services to be provided until the problem in the optical link is able to be resolved.

SUMMARY OF THE INVENTION

The present invention overcomes these and other drawbacks by providing a method and apparatus for remotely interfacing a network device in the physical plant. Remotely interfacing the network device allows a network technician to monitor, interrogate, and control, the network device, and upload new software to the network device without requiring the technician to be physically resident in the network device's environment. Remotely interfacing the network device may take place over the optical facilities connecting the network device to the central office, over existing copper facilities configured to provide power to the network device, or over one or more wireless links.

According to one embodiment of the invention, the network device deployed in the physical plant includes a wireless transceiver to enable the technician to interface with the network device over a wireless control channel. Providing a wireless interface to the network device allows the technician to access control and maintenance information on the network device such as the network device's management information base, monitor the network device's operation, interrogate the network device to ascertain specific aspects of its operation or aspects of the network on which it is operating, and control the network device to cause the network device to perform particular desired operations. Examples of operations include performing network device reset, interacting with other network devices on the network, and numerous other control and diagnostic functions. Additionally, providing a wireless interface enables the network technician to fix specific perceived problems in the network device, such as by uploading new software to the network device to enable the network device to have increased functionality or more reliable performance.

The network device may also be configured to enable communications to take place over existing copper facilities configured to provide power to the network device or through a wireless control unit available to the network device over the wireless interface. These communications enable the network device to provide emergency services, such as 911 services, as well as enable the network device to participate in testing aspects of the network on which it is operating, such as by participating in Optical Time Domain Reflectometry (OTDR) testing of the optical fibers connected to the network device.

The wireless link may be formed via any convenient technology, such as one of the IEEE (Institute of Electrical and Electronics Engineers) 802.11 technologies, other wireless technology, Infrared Data Association (IrDA)-based technology or other infra-red based technology, or ultrasonic-based technologies. Infra-red and ultrasonic transmissions may be advantageous in certain applications, such as where the network device is submerged in a manhole filled with water or other fluids. 802.11-based technologies and other wireless technologies are advantageous in certain applications as they do not rely on line-of sight communications and thus may allow the technician greater flexibility in selecting a convenient site from which to interface with the network device.

According to another embodiment of the invention, the wireless transceiver may be accessed by wireless subscribers when not being used by the technician to interface with the network device. Where the wireless technology used to interface with the network device is based on 802.11 or another commonly used wireless networking technology, it is possible to enable the network device to act as an 802.11 hot spot or other network access point thus allowing for the convenient deployment of wireless network access points in the physical plant. The network device deployed in the physical plant may be configured to receive power from the central office over existing copper facilities such as one or more existing subscriber loops. According to an embodiment of the invention, the existing copper facilities may be utilized to allow the network device to be accessed remotely from the central office to enable the central office to perform various maintenance and control operations on the network device, such as to allow the network device to participate in-physical layer testing of the optical fiber connecting the central office and the network device and to enable the continuation of emergency services during the network outage.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, according to an embodiment of the invention, a network device deployed in the physical plant includes a wireless access port to enable the network device to be accessed by a control unit. Enabling the network device to be accessed by a control unit enables a technician servicing the network device to monitor or perform functions on the network device remotely. Thus, where the network device is suspended above the ground, the network technician may stay safely on the ground while performing device and network diagnostics, upgrades, or other maintenance and management functions on the network device. Similarly, where the network device is deployed in a manhole or other underground enclosure, the network technician does not need to empty the manhole (if filled with water or other fluid or gas) to access the network device, and may stay above-ground and out of traffic while remotely interfacing with the network device. The wireless access may also assist with inventory management in the physical plant by allowing the network devices to be interrogated as to identity. Additionally, prior to physically accessing the network device, the wireless access may enable emergency services to be provide and enable the network device to communicate problem identification information so that an appropriate technical team may be dispatched to interface with the network device. Any number of functions may be performed while interfacing the network device, and the invention is not limited to any particular subset of possible functions or operations.

According to another embodiment of the invention, remote access to the network device deployed in the physical plant may occur over existing copper facilities configured to provide power to the network device. In this manner, communication with the network device may be maintained even when the optical facilities have been compromised. This allows the network device to participate in physical layer testing of the optical facilities and may provide a limited amount of connectivity between the central office and subscribers interfacing the network device, such as to provide emergency services, e.g. 911 services.

Figure 1:
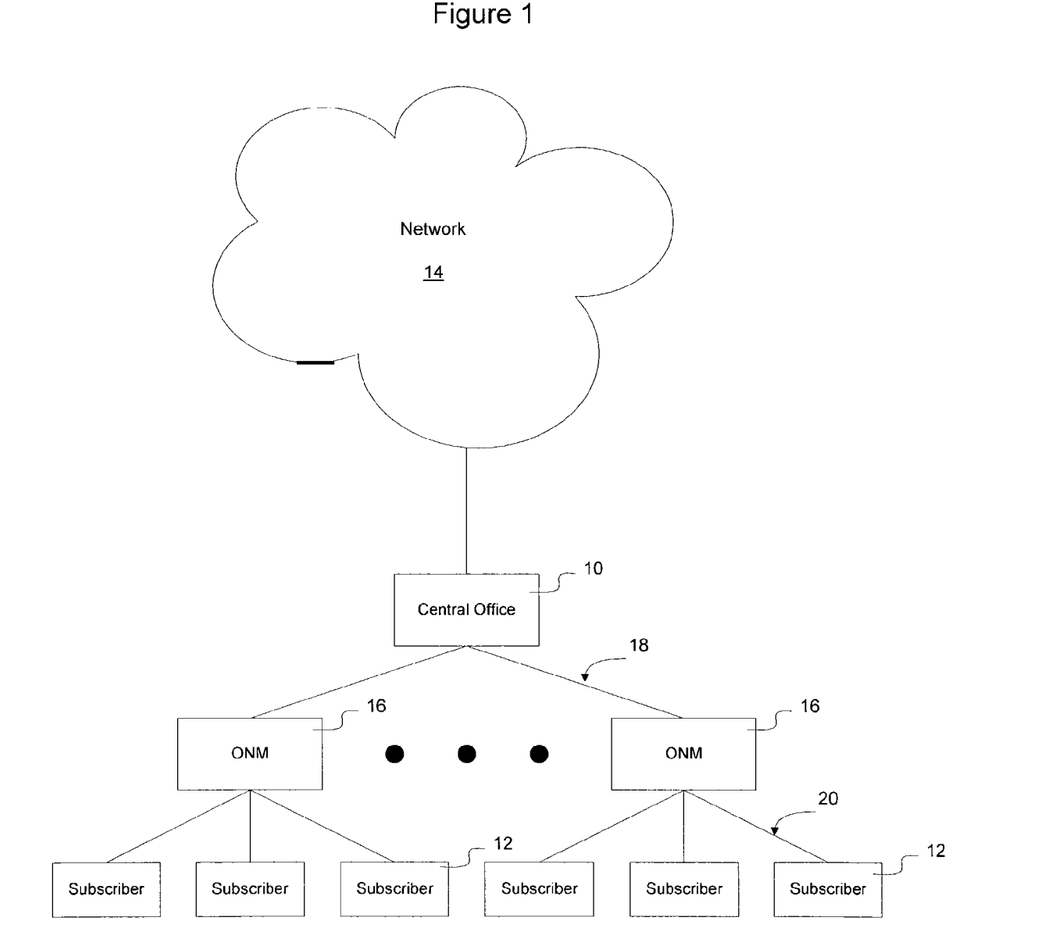
FIG. 1 is a functional block diagram of a network architecture according to an embodiment of the invention.
Figure 2:
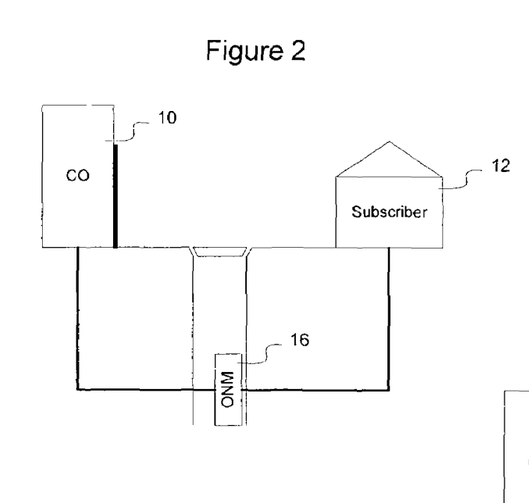
FIGS. 2-5 are functional block diagrams of placement of network devices in the physical plant according to embodiments of the invention.
Figure 3:
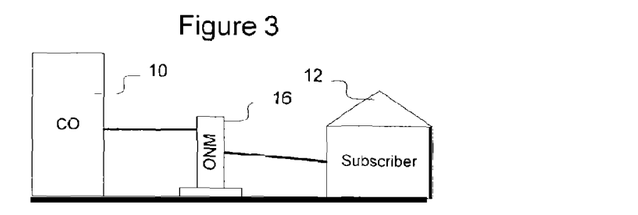
Figure 4:
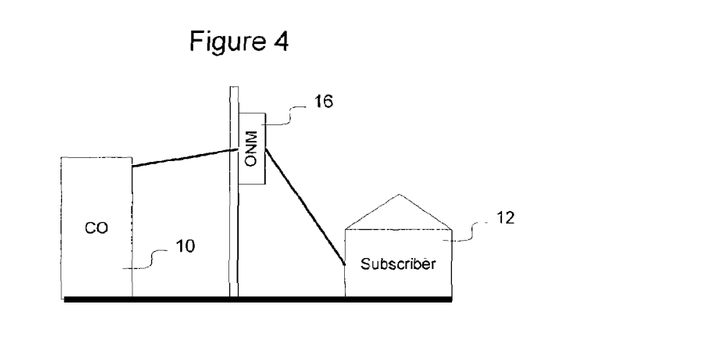

FIG. 1 illustrates a network architecture in which active electronic network equipment is deployed outside the central office in the physical plant. As illustrated in FIG. 1, a central office 10 provides connectivity between subscribers 12 and a communications network 14. The communications network in one embodiment may be the Internet or another data centric communications network. Active electronic equipment 16 is deployed outside of the central office, in the physical plant, and interposed between the central office 10 and the subscribers 12.

In one embodiment, a passive optical network 18 may be utilized to connect an Optical Line Terminating (OLT) network device at the central office 10 with an Optical Network Unit (ONU) integrated into the active electronic equipment 16. In the embodiment illustrated in FIG. 1, the active electronic equipment 16 also includes a Digital Subscriber Line Access Multiplexer (DSLAM), to enable the active electronic equipment 16 to aggregate DSL signals from DSL subscribers and pass the DSL traffic back to the central office. In the following description, the active electronic equipment 16 incorporating both an ONU and a DSLAM will be referred to as an Optical Networking Multiplexer (ONM). The invention is not limited to this embodiment but rather extends to all embodiments wherein active electronic equipment is deployed in the physical plant.

DSL enables high-bandwidth services to be provisioned over existing twisted pair copper telephone wires commonly referred to as "subscriber loops." Several different types of DSL technology have been developed, including Asymmetrical DSL (ADSL), High-bit-rate DSL (HDSL), Rate Adaptive DSL (RDSL), Symmetric DSL (SDSL), and Very high speed DSL (VDSL). These, and other DSL-based technologies, will be referred to herein collectively as xDSL. Subscribers may communicate with the DSLAM over a network 20 using any xDSL technology, and the invention is not limited to any particular xDSL technology.

Figure 5:
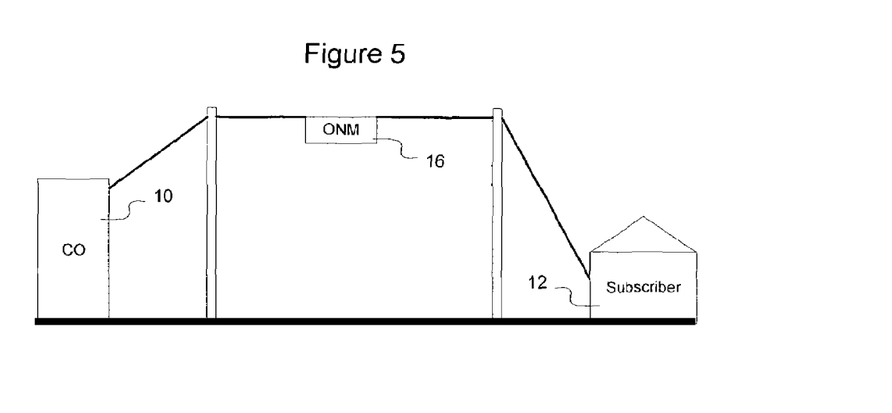

The active electronic equipment 16, such as the ONM illustrated in the figures, may be placed in many different locations in the physical plant. FIGS. 2-5 illustrate several possible places where active electronic equipment may be deployed in the physical plant. As shown in FIGS. 2-5, the ONM may be deployed in a manhole (FIG. 2) on a pedestal for example along side a junction wire interface (JWI) (FIG. 3), on a telephone pole (FIG. 4) or suspended on wires between telephone poles (FIG. 5). The ONM may be deployed in other locations as well, such as on the side of a building, or buried underground, and the invention is not limited to only these particular locations illustrated in FIGS. 2-5.

The network device may be housed in a reentrant packaging such as the packaging currently utilized to house splice enclosures. Utilizing a familiar reentrant packaging enables the ONM to utilize the same stack up and installation techniques that are currently used in connection with passive splice boxes. One example of a possible reentrant package usable in connection with the ONM according to an embodiment of the invention is the Armadillo™ brand enclosure currently used for fiber splices and available from Preformed Line Products. The invention is not limited to an implementation utilizing this particular packaging, however.

In one embodiment, optical fibers configured to be attached to optical facilities and copper wires suitable for splicing to subscriber loops and power lines are pre-attached to the device before the network device is shipped out to be installed in the physical plant. This facilitates deployment and allows the network devices to be installed in the physical plant by technicians not skilled in sealing reentrant packages or in commissioning the equipment. Splice boxes may be used to splice the pre-attached copper wires and optical fibers to subscriber loops and optical cables running from the central office, and to subscriber loops extending toward xDSL subscribers.

Figure 6:
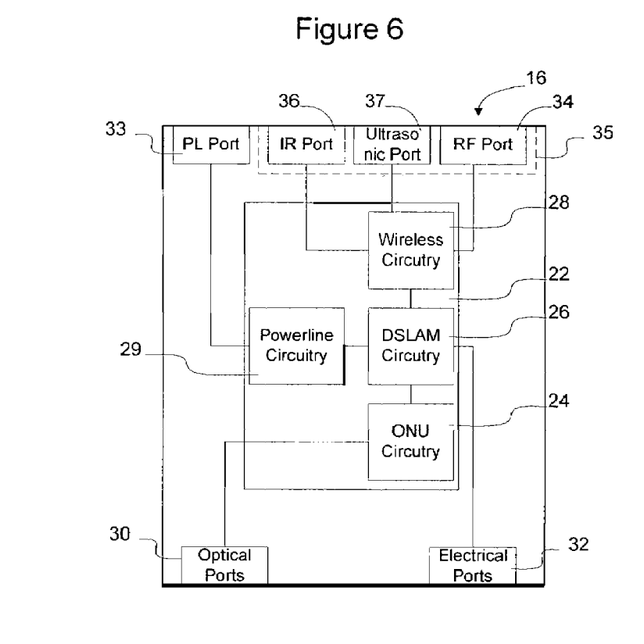
FIG. 6 is a functional-block diagram of an Optical Network Unit-Digital Subscriber Line Access Multiplexer (ONM) equipped with wireless transceiver ports according to an embodiment of the invention.

FIG. 6 illustrates an embodiment of a network device containing ONM circuitry 22 configured to enable the ONM to communicate with xDSL subscribers 12, the central office 10, and a control unit (described below). As shown in FIG. 6, the active ONM circuitry 22 includes ONU circuitry 24 configured to communicate over passive optical network 18 with central office 10, and DSLAM circuitry 26 configured to communicate over xDSL network 20 with subscribers 12. Wireless circuitry 28 is provided to enable the ONU 16 to be interfaced via the control unit. Optionally, power line communication circuitry 29 may be provided to enable the ONM to communicate with the central office over the subscriber loops and other existing copper facilities configured to provide power to the ONM.

One or more optical ports 30 and electrical ports 32 are provided to interface with the physical transmission media forming the optical and electrical networks in which the ONM will operate. A power port 33 may be provided to enable power to be supplied to the ONM and to enable powerline communication to take place with the central office. The ONM may be configured to communicate utilizing different protocols with the central office than with the DSL subscribers. According to one embodiment, the ONM communicates with the central office utilizing Ethernet over ATM, although the invention is not limited to this embodiment as any combination of protocols may be used to exchange data between the ONM and the central office.

The ONM device 16 also one or more wireless ports 35, such as an RF port 34, an IR port 36, and an ultrasonic port 37. The RF port may include an internal antenna configured to enable wireless access to the network device 16. Alternatively, the internal antenna may be replaced or supplemented through the provision of a port through which the ONM 16 may be connected to an external antenna. The InfraRed (IR) port 36 may be provided to enable the network device to communicate with the control unit utilizing infrared signals. The IR port 36 may be configured to communicate using the Infrared Data Association (IrDA) standard or another standard or proprietary protocol for enabling IR transmission of packets. Optionally, an ultrasonic port 37 may be included to enable the ONM device 16 to be accessed via one or more ultrasonic communications technologies.

The wireless circuitry 28 is configured to process wireless signals and implement instructions received over the wireless ports 35 on the ONM. The invention is not limited to a network device employing two or more types of wireless access, as it may be desirable under certain conditions and for particular applications to only utilize one type of wireless access. Similarly, it may be desirable under particular circumstances to enable more than three different technologies to access the network device. Accordingly, the invention is not limited to the illustrated embodiment employing IR, ultrasound, and wireless remote access, but rather extends to all manners of obtaining remote access and all combinations of technologies. The example illustrated in FIG. 6 is merely an example of one manner of configuring the network device that will be used for purposes of explaining the invention. The invention is not limited to this particular example.

Any wireless technology may be utilized to interface with the network device. For example, transmissions may take place in one or more of the unlicensed spectrum bands (902-928 MHz, 2.4-2.4835 GHz, or 5.725-5.850 GHz). Transmissions may also take place in one or more licensed spectrum bands. The transmissions may be formed utilizing one or more wireless standards. Examples of wireless standards include Wi-Fi (802.11b), Bluetooth, HIPERLAN/2, 802.11a, 802.11g, technologies based on other 802.11 standards, HomeRF (Home Radio Frequency) and DECT (Digital Enhanced Cordless Telecommunications) as well as competing technologies such as GPRS/EDGE (General Packet Radio Service/Enhanced Data rates for Global Evolution), 3G (third Generation) mobile and TETRA (Terrestrial Trunked Radio). The invention is thus not limited to a particular frequency or wireless transmission protocol.

According to one embodiment of the invention, the wireless technology selected to enable the network device to be interfaced remotely is based on a technology that is commonly used by wireless network subscribers. For example, the wireless channel may be implemented in the UMTS licensed spectrum, spectrum utilized by other cellular technology-based standards, or spectrum utilized in implementation of on one of the 802.11 standards. As discussed in greater detail below, this allows the network device to provide wireless network access to subscribers as well as enabling the network device to be interfaced by a technician.

Figure 7:
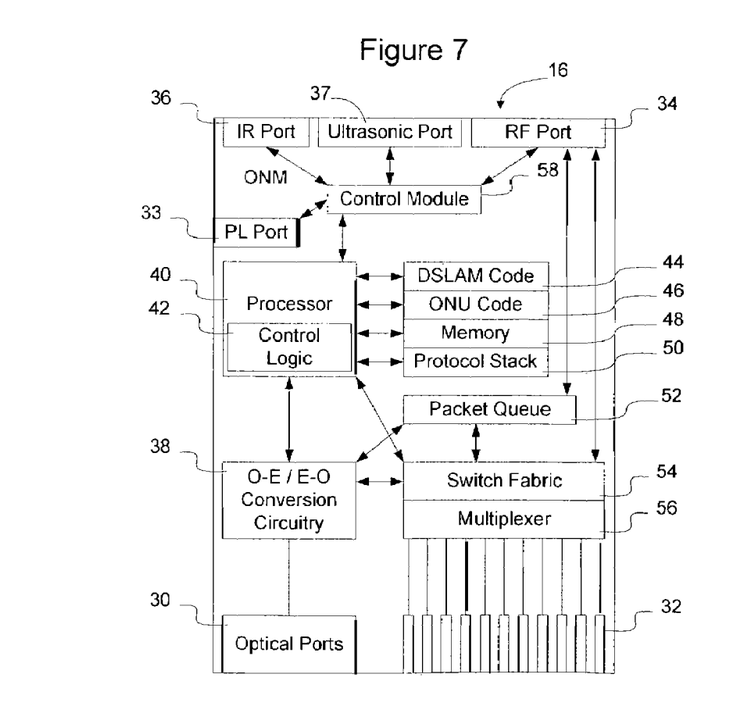
FIG. 7 is a functional block diagram, of a network device equipped with wireless transceiver circuitry according to an embodiment of the invention.

FIG. 7 illustrates the network device of FIG. 6 in greater detail. As shown in FIG. 7, an ONM 16 according to an embodiment of the invention includes optical ports 30 configured to connect with optical fibers linking the ONM with the central office 10. Although the ONM according to the invention includes optical ports facing the central office, the invention is not limited to this embodiment as other ports may be utilized as well, such as electrical ports, point-point infrared, wireless, or other ports configured to transfer data over another convenient transmission medium.

In the embodiment of FIG. 7, the optical ports are connected to optical-electrical/electrical-optical conversion circuitry 38. O-E/E-O conversion circuitry 38 is configured to convert optical signals received over optical ports 30 into electrical signals for processing by the other circuitry of ONM 16. The E-O portion of O-E/E-0 circuitry is configured to convert electrical signals into optical signals to be transmitted to the central office over the optical ports 30. Where communications between the ONM 16 and central office 10 are based on an electrical physical layer, the conversion circuitry 38 may be eliminated.

The ONM contains a processor 40 having control logic 42 configured to enable it to control ONM 16 and otherwise perform functions ascribed to an ONU and a DSLAM. DSLAM code 44, ONU code 46, and other data and/or instructions are stored in memory 48 for use by the control logic 42 to enable it to perform the functions required of it to participate in communicating with network administrators, users, and other network devices. Interactions on the network and during protocol exchanges with other network devices on the network may be facilitated through the implementation of a protocol stack 50 containing instructions and data relevant to communications protocols commonly used on the network and by the network devices.

The control logic 42 may be implemented as a set of program instructions that are stored in a computer readable memory within the network device and executed on a microprocessor within the network device. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

A packet queue 52 is implemented to store packets received for transmission over the optical network 18 or over the DSL network 20. The packet queue may store packets for transmission where, for example, data is received faster than it can be processed or output on the network. A switch fabric 54 enables packets to be directed to the proper output port 32 when more than one output electrical port is implemented on the ONM 16. A multiplexer 56 receives packets in parallel on the various DSL ports 32, serializes the data, and passes the data to the switch fabric. Optionally, the multiplexer 56, alone or in combination with the packet queue 52, may apply policies to incoming and outgoing traffic and otherwise enforce service level agreements with DSL subscribers.

A control module 58 enables a control unit to interface the ONM via RF port 34, infra-red port 36, ultrasonic port 37, other wireless ports 35, or powerline data port 33. The control module may enable multiple functions of the ONM to be interrogated, modified, and/or controlled. For example, new or modified DSLAM code may be updated to the ONM via the control module 58. In another embodiment, diagnostic programs may be downloaded and run on the control module or run on the handheld control unit to enable the ONM to be interrogated to ascertain a likely source of malfunction, perform reset operations, or perform any other conventional functions on ONM 16. Additionally, network verification tests may be run via the control module to cause the processor to output signals on the networks to which it is connected to determine a likely cause and/or location of network failure. The invention is not limited to any particular set of functions performable by interfacing the ONM 16.

The ONM may receive power from existing copper facilities deployed in the physical plant, such as one or more subscriber loops connected between the central office and the ONM, and may also obtain limited communication services from the central office over the existing copper facilities. According to one embodiment of the invention, the subscriber loops may be utilized to remotely access the ONM to interrogate, provision, and control the ONM, and to enable the ONM to participate in physical layer testing of the optical facilities interconnecting the central office and the ONM. For example, the ONM may be configured to perform Optical Time Domain Reflectometry (OTDR) tests on the optical fibers to which it is connected to help locate a likely location on the optical fiber where a break or other fault might have occurred. Additionally, emergency services, such as 911 services, may be provided over the existing copper facilities. Information associated with the OTDR tests and emergency services may be relayed back to the central office over the existing copper facilities utilized to provide power to the ONM using a conventional transmission standard, such as a telephone modem standard or an xDSL standard. The invention is not limited to any particular manner of communicating over the existing copper facilities with the CO. Where the ONM is not provided with intelligence, e.g. software, instructions and data sufficient to enable it to participate with the CO may be received by the ONM over the existing copper facilities or from the wireless control unit.

As described in greater detail below in connection with FIG. 8, one or more of the wireless ports 35 may be configured, according to one embodiment of the invention, to allow wireless subscribers to access the network 14 through the ONM 16. In this embodiment, data packets received over the wireless port 35 are passed to the packet queue 52, the switch fabric 54, or other constructs in ONM 16 configured to receive and/or process packets.

Figure 8:
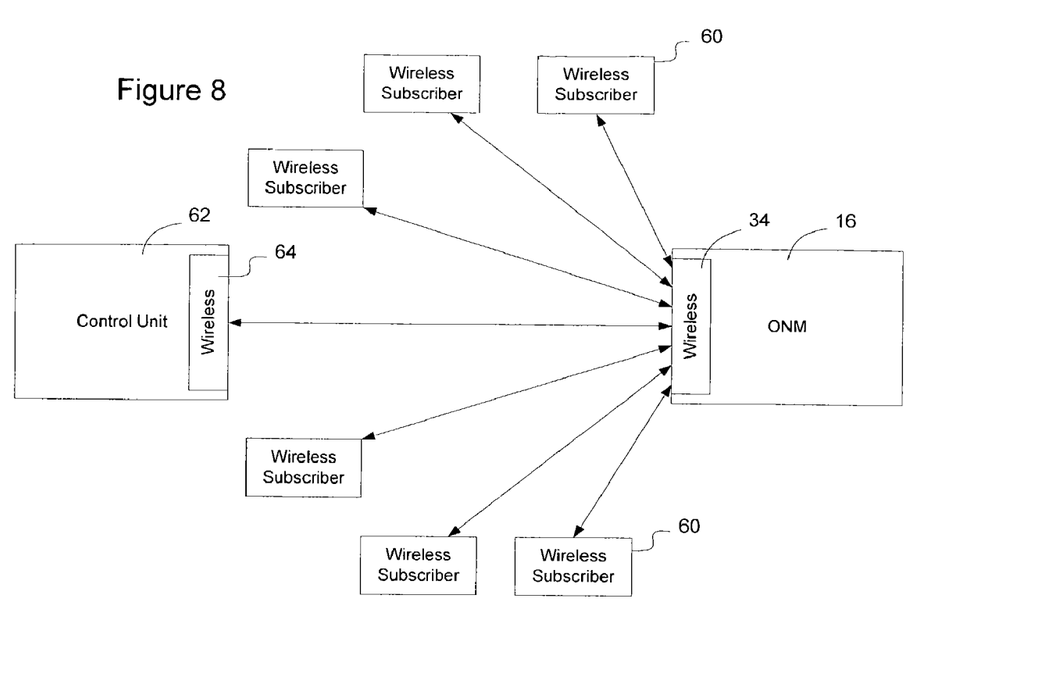
FIG. 8 is a network diagram of a network device capable of being interrogated by a control unit and accessed by subscribers over a wireless network.

FIG. 8 illustrates a ONM 16 having one or more wireless access ports 35 according to an embodiment of the invention. In this embodiment, the wireless port is accessible by wireless subscribers 60 in addition to a wireless control unit 62 having a wireless transceiver 64. Wireless control unit 62 is described in greater detail below in connection with FIG. 9. As shown in FIG. 8, multiple wireless subscribers, such as 802.11 wireless subscribers 60 or cellular wireless subscribers, may access the network through ONM 16 to thereby enable the ONM 16 to function as an 802.11 hotspot or a cellular base transceiver station. The invention is not limited to an 802.11-based wireless communication protocol, as described above.

Figure 9:
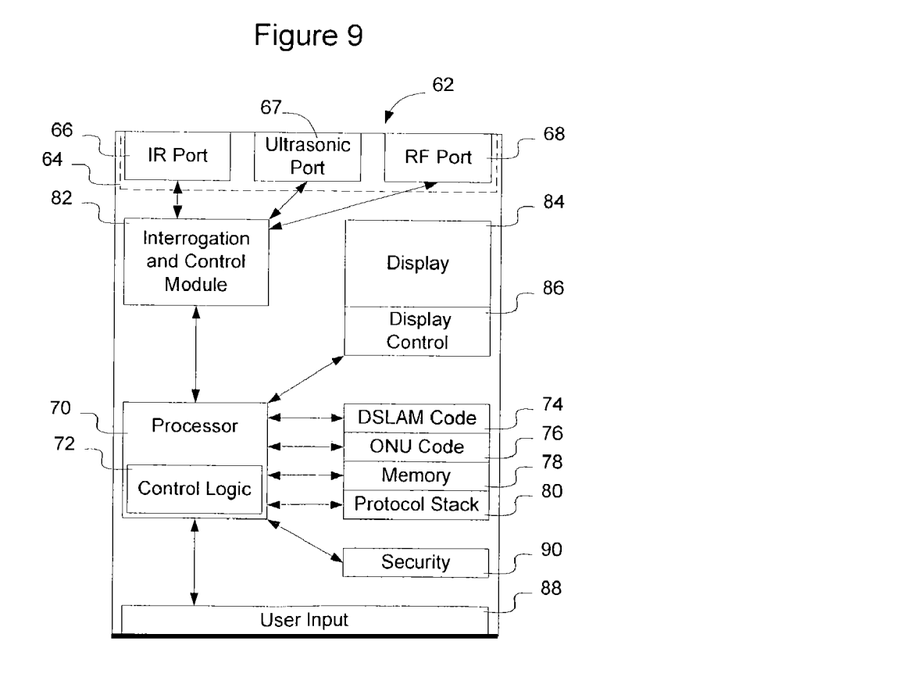
FIG. 9 is a functional block diagram of a control unit according to an embodiment of the invention.

FIG. 9 illustrates a control unit 62 configured to interface with the ONM 16 described above. As shown in FIG. 9, the control unit 62 includes one or more wireless ports 64, such as an infrared port 66, an ultrasonic port 67, and an RF port 68. These ports enable the control unit to communicate with the ONM 16 to perform various control, maintenance, and other functions, and to provide emergency communication services, as described above. Optionally, an extension may be provided to enable an optical probe, for example connected to the end of a telescoping pole, to be connected to the control unit 62. Attachment of an optical probe is useful, for example, where the ONM 16 is deployed in a manhole and submerged.

Placing the optical probe below the waterline eliminates surface reflections and thus enables stronger IR signals to be exchanged between the control unit 62 and ONM 16. Additionally, inclusion of an IR-based communication port or other communication port capable of operating through water enables communications to take place with the network device without requiring the manhole to be emptied of water and other fluids and gasses such as natural gas. Utilization of ultrasonic communication may be advantageous where the IR port is compromised or obscured by dust or other debris. Also, communication may take place without requiring the technician to enter an unknown environment, such as a manhole, which may be occupied by insects and other creatures.

The control unit 62 contains a processor 70 having control logic 72 configured to enable it to control ONM 16 and otherwise perform functions required of a conventional hand-held control unit. DSLAM code 74 and ONU code 76 may be stored on control unit 62 so that it may be uploaded onto ONMs deployed in the physical plant. Other data and/or instructions are stored in memory 78. Interactions with the ONM 16 may be facilitated through the implementation of a protocol stack 80 containing instructions and data relevant to communications protocols commonly used on the network and by the network devices.

According to one embodiment of the invention, the control unit is an intelligent control unit having a processor and software configured to interface with a relatively unintelligent ONM. The ONM, in this embodiment, includes sufficient hardware to enable it to perform instructions passed to it from the control unit, but does not include diagnostic software or other software to perform self-diagnostic functions or self-repair functions. In this embodiment, the intelligence is maintained in the control unit to enable the control unit to interrogate and reconfigure itself. Upon input of instructions from the control unit, the hardware on the ONM will perform specified diagnostic and configuration processes, to enable it to analyze what is happening on the ONM and reconfigure itself through the assistance of the control unit. Examples of diagnostic and self repair that may take place include ascertaining a malfunction on a particular node and trying a different node, ascertaining a problem in the ONM power supply and attempting to attach to an alternative power supply. Numerous other diagnostic and self repair functions may be performed as described above and the invention is not limited to this select few described functions.

An interrogation and control module 82 interfaces between the processor and the data ports to facilitate interrogation and control functions. A display 84 controlled by a display controller 86 provides information to the user about the status of the ONM. An user input 88 allows the user to input instructions to the control unit 62 so that the user can specify actions to be taken on the ONM. The user input may be a key pad, keyboard, stylus, mouse, track pad, track ball, soft keys or any other type of user input device configured to enable the user to input information into the control unit or to otherwise control the operation of the control unit. The control unit may also include an access port to enable it to be interfaced by a computer system. One or more of the wireless ports 64 may also be utilized for this purpose.

Optionally, a physical and/or logical security module 90 may be included to prevent unauthorized persons from operating the control unit. In one embodiment, the security module is a physical module that requires the operator to possess a particular object to access the device, such as a key, or an access card. In another embodiment, the security module is a logical security module, implemented in software, firmware, or hardware, that requires the user to input a passcode or other identification information prior to enabling the user to access the device. In another embodiment, both physical and logical security modules are implemented. The invention is not limited to any particular implementation of the security aspect of the hand-held control unit.

The RF port 68, according to one embodiment of the invention, is also configured to communicate via standard wireless communications protocols, over a cellular or PCS network, to enable the control unit to communicate with a central network prior to, during, or after communicating with the ONM 16. The ability to interface between the ONM 16 and central office 10 over a wireless link enables the ONM to communicate with the central office even where the link between the ONM and the central office has been compromised. This enables the control unit to provide emergency communication services to the ONM 16 where, for example, the optical link to the central office has failed.

Optionally, as described above, an optical extension, such as an optical extension attached to a telescoping or other pole may be attached to the control unit to enable the IR port to be placed in closer proximity to the network device.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A network device that is able to be remotely interfaced by a technician proximate the network device after the network device has been deployed in the field to enable the technician to perform diagnostic operations on the network device to determine an operational status of the network device, the network device containing a local interface to enable the technician to use a wireless control unit to directly communicate wirelessly with the network device from a location proximate the network device, the network device comprising a computer-readable medium containing instructions for controlling at least one processor to implement control logic to:

interface with a central office to receive data and control signals from the central office;

interface with a plurality of network access subscribers to provide network access to the network access subscribers; and     interface with the wireless control unit to receive control signals from the wireless control unit and enable the wireless control unit to perform the diagnostic operations on the network device while the network device is deployed in the field and without requiring the operator to come into direct contact with the network device to perform the diagnostic operations on the network device.

2. The network device of claim 1, further comprising an optical port to enable the network device to communicate with the central office over an optical communications link.

3. The network device of claim 2, wherein the control logic that interfaces with the a central office enables the network device to communicate over a passive optical network.

4. The network device of claim 1, wherein the control logic that interfaces with the plurality of network access subscribers implements digital subscriber line access multiplexer functionality to enable the network device to operate as a Digital Subscriber Line Access Multiplexer (DSLAM) for the plurality of network access subscribers which interface with the network device; and     wherein the plurality or network access subscribers interface with the network device over subscriber loops connected to the network device.

5. The network device of claim 1, further comprising an internal wireless antenna to receive and transmit wireless signals, or a port to enable the network device to be connected to an external wireless antenna that is to receive and transmit wireless signals, the internal wireless antenna or external wireless antenna working in connection with the control logic to enable the wireless control unit to receive the control signals from the local control unit.

6. The network device of claim 5, wherein said network device is configured to provide network access to wireless subscribers via the internal wireless antenna or external wireless antenna.

7. The network device of claim 1, further comprising an infrared port to enable the network device to be interfaced via signals transmitted in an infrared portion of the spectrum, or an ultrasonic port to enable the network device to be interfaced via ultrasonic signals, the infrared port or ultrasonic port working in connection with the control logic to enable the wireless control unit to receive the control signals from the local control unit.

8. The network device of claim 1, further comprising a packet queue to store packets of data for transmission and a switch fabric to switch packets to the network access subscribers.

9. The network device of claim 1, wherein the control logic further enables the network device to communicate utilizing a first protocol with the central office, and to communicate utilizing a second protocol with the network access subscribers.

10. The network device of claim 9, wherein the first protocol is Ethernet and wherein the second protocol is an xDSL (digital subscriber line) based technology.

11. The network device of claim 1, wherein the control logic further provides emergency services to the network access subscribers over the interface with the wireless control unit.

* * * * *